Patented Sept. 11, 1951

2,567,304

UNITED STATES PATENT OFFICE 2,567,304

SOLUBLE, UNSATURATED, AIR-DRYING INTERPOLYMERS OF 2-ALKENOXYALKYL ESTERS OF ALPHA-OLEFINIC MONOCARBOXYLIC ACIDS WITH SELECTED 2-ALKENYL COMPOUNDS AND PROCESS OF MAKING SAME

Pliny O. Tawney, Passaic, N. J., assignor to United States Rubber Company, New York, N. Y., a corporation of New Jersey No Drawing. Application February 11, 1948, Serial No. 7,701

9 Claims. (Cl. 260—86.1)

My invention relates to a method for preparing a new class of soluble, unsaturated resins which can be readily converted to insoluble, heat-resistant products by further polymerization at moderate temperatures and in the presence or absence of oxygen. More specifically, my invention concerns the preparation of new, soluble, air-drying resins from 2-propenoxyalkyl esters of alpha-olefinic monocarboxylic acids, as well as from mixtures thereof with copolymerizable monoolefinic compounds, by interpolymerization with a compound of the class consisting of 2-propenyl alcohols, 2-propenyl chlorides, 2-propenyl monoethers of non-enic monohydric alcohols, and 2-propenyl esters of non-enic monocarboxylic acids.

Prior to the present invention, the polymerization and copolymerizations of the above-mentioned type of 2-propenoxyalkyl ester were known to yield insoluble gels before more than a minor amount of the 2-propenoxyalkyl ester had been converted to the polymeric form. The resulting intractable heterogeneous mixture of gel, unreacted monomer and low molecular weight polymers is of little or no commercial utility. Through my discovery of the unique interpolymerization with 2-propenyl alcohols, chlorides, ethers and esters, however, it is now possible to convert the major proportion of the 2-propenoxyalkyl esters to the soluble, polymeric form without danger of gelation. Moreover, the resulting soluble, unsaturated products can be easily converted to a solvent- and heat-resistant form by further polymerization which, surprisingly, can be effected at room temperature, i. e., ca. 25° C., and in the presence of oxygen, even though the latter has been generally regarded as an inhibitor in the curing of many unsaturated synthetic resins.

The copolymerizable 2-propenyl alcohols, chlorides, ethers and esters which are used in my invention can be any compounds selected from those having either of the formulas CH₂=CH—CH₂X, RCH=CH—CH₂X and
CH₂=C(R)—CH₂X, where R is selected from the group consisting of chlorine, methyl, chloromethyl and ethyl and where X is a radical selected from the group consisting of hydroxyl; chlorine; alkoxy, e. g., methoxy, ethoxy, beta-hydroxyethoxy, propoxy, isopropoxy, n-butoxy, isobutoxy, amyloxy, hexoxy, heptoxy, octoxy, nonoxy, decoxy; cycloalkoxy, e. g., cyclohexoxy; aryloxy, e. g., phenoxy, tolyloxy; aralkoxy, e. g., benzyloxy; and acyloxy, e. g., acetoxy, propionoxy, isobutyroxy, valeroxy, benzoyloxy. Illustrative of such compounds are allyl chloride, methallyl chloride, crotyl chloride, 1,3-dichloropropene, 2,3-dichloropropene, 1,4-dichlorobutene-2, 2-(chloromethyl)allyl chloride, allyl alcohol, methallyl alcohol, 2-chloroally alcohol, crotyl alcohol, 2-ethylallyl alcohol, allyl methyl ether, methallyl ethyl ether, beta-allyloxyethanol, allyl propyl ether, methallyl butyl ether, methallyl amyl ether, methallyl heptyl ether, allyl octyl ether, crotyl ethyl ether, 2-chlorallyl ethyl ether, methallyl phenyl ether, allyl benzyl ether, allyl acetate, 2-chlorallyl propionate, methallyl butyrate, and ethallyl valerate.

The term "2-propenyl" as used herein includes both the unsubstituted 2-propenyl radical (i. e., the allyl radical) and the 2-propenyl radical which is substituted in either the 2- or the 3- position (but not in both) with chlorine, methyl, chloromethyl or ethyl. Thus it includes only allyl, 2-chloroallyl, 3-chloroallyl, methallyl, crotyl, 2-chloromethyl, 3-chloromethyl, 2-ethylallyl and 3-ethylallyl radicals.

Where X in the above formulas is hydroxyl the 2-propenyl compound is an allyl-type alcohol. Similarly where X is chlorine the compound is an allyl-type chloride.

Where X is an alkoxy, cycloalkoxy, aryloxy or aralkoxy group, the 2-propenyl compound is an ether. The group, other than 2-propenyl, attached to the ether oxygen atom may be any alkyl group, cycloalkyl group, aryl group or aralkyl group. The alkyl group may be unsubstituted or may be substituted with a hydroxyl group.

Where X is an acyloxy group, the 2-propenyl compound is an acyl ester. Any acyl group may be attached to the oxygen to which the 2-propenyl group is connected, preference being given to acyl groups derived from non-enic monocarboxylic acids, i. e., the fatty acids.

Among the above-mentioned types I have found the 2-propenyl alcohols and the 2-propenyl chlorides to be the most effective in repressing gelation of a polymerizing 2-propenoxyalkyl ester or of mixtures thereof with various copolymerizable monoolefinic compounds. The resulting interpolymers of the 2-propenyl alcohols are especially advantageous in regard to the rapidity and completeness with which they can be cured to solvent- and heat-resistant products. The corresponding interpolymers of the 2-propenyl chlorides are particularly useful where products of decreased flammability are desired although such materials are somewhat inferior to the interpolymers of the 2-propenyl alcohols, ethers and carboxylic acid esters in regard to their resistance to discoloration at high temperatures. For optimum resistance to wetting and attack by hydrophilic solvents, the interpolymers of the 2-propenyl ethers of non-enic monohydric alcohols are preferred although in many cases the interpolymers of the 2-propenyl esters of non-enic monocarboxylic acids have proven nearly equivalent in this respect. Both the 2-propenyl ethers and carboxylic esters are likewise useful in endowing the resulting copolymers with improved flexibility and this effect can be enhanced by the use of the 2-propenyl ethers and esters of long chain alcohols and carboxylic acids respectively. By "long chain" I mean having at least six carbon atoms per molecule.

I have found that in the practice of my invention the presence of as little as 0.2 of a mole of the 2-propenyl alcohol, chloride, ether or ester per mole of the 2-propenoxyalkyl ester is sufficient to secure a substantially increased conversion of the latter monomer to the soluble polymeric form. As the proportion of the 2-propenyl alcohol, chloride, ether or ester in the initial reaction mixture is increased, the proportion of the 2-propenoxyalkyl ester converted to this soluble polymeric form is likewise increased and optimum yields of soluble, unsaturated polymeric material can be obtained from reaction mixtures initially containing as much as 5 moles of the 2-propenyl alcohol, chloride, ether or ester per mole of the 2-propenoxyalkyl ester. Thus use of from 1 to 5 moles of the 2-propenyl compound per mole of 2-propenoxylalkyl ester is often preferred.

The proportion of the 2-propenyl compound employed in the present invention will vary widely depending upon the particular 2-propenoxyalkyl ester employed and even more upon the particular 2-propenyl compound used. Therefore it is not possible to specify with exactness the proportion required to effect conversion of a major proportion of the ester to the soluble, polymeric form. It will seldom be desirable to use a proportion outside the range of 0.2 to 5 moles of 2-propenyl compound per mole of the 2-propenoxyalkyl ester. The use of less than 0.2 mole of the 2-propenyl compound per mole of the ester will seldom lead to any useful result and the use of more than 5 moles per mole of the ester will not give sufficient advantage to be economically feasible. In many cases it will be desirable to use a ratio of at least 1 mole of the 2-propenyl compound per mole of 2-propenoxyalkyl ester.

The 2-propenoxyalkyl esters which are operable in my invention are those derived from alpha-olefinic monocarboxylic acids, e. g., acrylic, crotonic, angelic and cinnamic acids. The preferred group within this class are the 2-propenoxyalkyl esters of acrylic and alpha-substituted acrylic acids from the group consisting of methacrylic, ethacrylic and alpha-chloracrylic acids, which esters are particularly adapted to the process of my invention by virtue of their high degree of reactivity therein and their expeditious conversion to my new soluble, unsaturated interpolymers in high yields. The preferred acids have the general formula $CH_2=C(R)-COOH$ where R is selected from the group consisting of hydrogen, methyl, ethyl and chlorine. Of the 2-propenoxyalkanols suitable for the preparation of such esters, the most readily available class are the beta-(2-propenoxy)alkanols selected from the group consisting of $RCH=CH-CH_2-O-CH(R')-CH(R'')-OH$ and $CH_2=C(R)-CH_2-O-CH(R')-CH(R'')-OH$ where R, R' and R'' are selected from the group consisting of hydrogen and alkyl, the alkyl group preferably not containing over three carbon atoms, i. e., methyl, ethyl and propyl. The preferred groups are the beta-(2-propenoxy)ethyl alkenoates such as beta-allyloxyethyl acrylate, beta-2-methallyloxyethyl methacrylate, beta-2-methallyloxyethyl acrylate, beta-allyloxyethyl acrylate and beta-allyloxyethyl-alpha-chloroacrylate.

As previously mentioned, various copolymerizable monoolefinic compounds can likewise be present in the initial polymerization reaction mixtures along with the 2-propenoxyalkyl esters and the 2-propenyl alcohols, chlorides, ethers or esters. The inclusion of such third copolymerizable compounds permits numerous variations in the properties of the resulting soluble, unsaturated resins to be attained. Thus for example the copolymerization of the 2-propenoxyalkyl ester and a 2-propenyl alcohol, chloride, ether or ester with an olefine such as styrene, vinyl-naphthalene, or isobutylene yields resins of improved compatibility with cheap hydrocarbon solvents, an important factor in the formulation of commercial surface coatings. Copolymerization with halogenated monoolefinic compounds such as vinyl chloride, vinylidene chloride and the dichlorostyrenes, yields polymeric materials of increased flame-resistance and often of greater hardness. The latter property can also be enhanced by copolymerization with olefinic nitriles, amides and imides, e. g., acrylonitrile, acrylamide, methacrylamide and N-vinyl-phthamilime. On the other hand, softer and more flexible products can usually be obtained by copolymerization with olefinic acid esters of non-enic monohydric alcohols as the third ingredient, including the acrylates, methacrylates, maleates, fumarates, itaconates, mesaconates and aconitates, particularly such esters derived from alcohols containing a chain of two or more carbon atoms, e. g., ethanol, n-butanol, 2-ethylhexanol and octanol.

The above-mentioned types of monoolefinic compounds are exemplary of the general class of third copolymerizable monomers which are operable in my invention and may in part be represented by the type formula $XYC=CHZ$ where (1) Z may be hydrogen in which case Y is hydrogen, methyl or chlorine and X is one of the substituents aryl, substituted aryl, chlorine, acyloxy, acyl, carbalkoxy, alkoxy, methyl, carbonitrilo, carbamyl and carboxyl, or Y is carbalkoxymethyl in which case X is then carbalkoxy; or (2) Z may be carbalkoxy in which case Y is hydrogen, chlorine or methyl and X is carbalkoxy. Illustrative of such compounds are styrene, alpha-methyl styrene, p-methyl styrene, vinyl chloride, vinylidene chloride, vinyl butyrate, methyl vinyl ketone, n-butyl acrylate, methyl methacrylate, methyl alpha-chloroacrylate, vinyl n-butyl ether, isopropenyl methyl ether, isobutylene, acrylonitrile, methacrylonitrile, acrylamide, dibutyl fumarate, dimethyl mesaconate, dimethyl citraconate, dihexyl itaconate.

The amount of the monoolefinic third copolymerizable compound employed is usually in the range of 0 to 2 moles per mole of the 2-propenoxyalkyl ester. Larger amounts may be used, but in many cases the curing time of the resulting copolymers is prolonged and their valuable air-drying property is markedly diminished.

The interpolymers of my invention are prepared by heating a mixture of the 2-propenoxyalkyl ester and the 2-propenyl alcohol, chloride, ether or acyl ester in the presence or absence of one or more of the above-mentioned copolymerizable monoolefinic compounds at temperatures in the range of from about 25° to 120° C. and preferably in the range of from 60° to 100° C. The interpolymerization reaction is promoted by peroxidic compounds, particularly organic peroxides such as benzoyl peroxide, acetyl peroxide, acetyl benzoyl peroxide, succinyl peroxide and tert.-butyl hydroperoxide, the amounts thereof being usually in the range of from 1.0 to 15.0% and mainly from 1.0 to 5.0% by weight of the mixture of monomeric reactants.

The course of the interpolymerization reaction can be followed by observing the increase in the viscosity of the reaction mixture or by withdrawing samples and determining the amount of interpolymer formed. When the reaction has proceeded to the desired extent, it is halted whereupon the interpolymer may be isolated from the reaction mixture by evaporation of the unreacted starting materials or by precipitation with a non-solvent, e. g., n-hexane and diethyl ether. Although unnecessary for most commercial applications, the interpolymers can be further purified by repeated solution in a solvent such as acetone and precipitation with the non-solvent. Concentration of the precipitating baths yields an additional amount of lower molecular weight interpolymers ranging in character from viscous oils to gummy solids. These are likewise useful as soluble, convertible resins either alone or in admixture with the solid interpolymers which are the chief products of my invention.

For applications in the coatings field my interpolymers can be dissolved in appropriate solvents, e. g., xylene. Alternatively, solvents boiling higher than the 2-propenyl alcohol, chloride, ether or ester can be added to the crude interpolymerization reaction mixture which is then partially distilled to remove any unreacted 2-propenyl alcohol, chloride, ether or ester. The resulting solution is admixed with a catalytic quantity of one of the materials known to the coatings art as "driers," e. g., cobalt naphthenate. Suitable dyes, pigments, filters and plasticizers may likewise be added if desired. Upon application of such solutions to porous or non-porous surfaces, the coatings become tack-free within a short time, e. g., 2 to 4 hours, at room temperature and converted to solvent- and heat-resistant films upon standing for a few additional hours. This curing process can be accelerated by heating to moderately elevated temperatures, e. g., 50° to 90° C. The mild conditions under which my interpolymers can be completely cured to solvent- and heat-resistant films render them particularly well adapted for use as wood finishes.

Although my interpolymers possess particular virtue as air-drying coating resins, they may likewise be employed in impregnating, casting and molding operations. Inert addends, i. e., fillers, pigments, etc. such as those mentioned above can be incorporated with the interpolymers with or without the addition of copolymerizable monomeric compounds, e. g., methyl mechacrylate, styrene, diethyl fumarate and diallyl fumarate. The resulting compositions can then be converted to an insoluble, substantially infusible state by further polymerization which is promoted by heat and/or polymerization catalysts such as the above-mentioned peroxidic compounds.

The following examples disclose my invention in more detail. All parts are by weight.

EXAMPLE 1

Mixtures of beta-allyloxyethyl acrylate with various 2-propenyl alcohols, chlorides, ethers and esters, as previously defined, are heated with benzoyl peroxide at 60° C. until the point of incipient gelation is attained in each case. The reaction mixtures are then cooled and poured into an excess of a 50–50 mixture of n-hexane and diethyl ether. The precipitated polymeric materials can be further purified if necessary, by repeated solution in acetone and precipitation with the ether-hexane mixture after which they are dried in vacuo to constant weight.

The reactions are summarized below in Table I together with an example (I–a) of the prior art polymerization of beta-allyloxyethyl acrylate in the absence of a 2-propenyl alcohol, ether or ester to emphasize the advantages of my invention.

Table I

| | Parts Beta-Allyloxyethyl Acrylate | 2-Propenyl Alcohol, Chloride, Ether or Ester | Parts | Parts Benzoyl Peroxide | Reaction Time (Hours) | Parts Soluble Polymeric Product Obtained |
|---|---|---|---|---|---|---|
| a | 100 | | | [1] 0.0 | 0.5 | 9.3 |
| b | 100 | Allyl Alcohol | 10.0 | 0.9 | 0.5 | 14.44 |
| c | 100 | ---do--- | 50.0 | 1.0 | 2.75 | 24.0 |
| d | 100 | ---do--- | 200.0 | 4.0 | 48.0 | 75.0 |
| e | 100 | Methallyl Alcohol | 10.0 | 0.4 | 0.2 | 12.1 |
| f | 100 | ---do--- | 100.0 | 3.0 | 1.0 | 84.0 |
| g | 100 | Methallyl Ethyl Ether | 100.0 | 0.15 | 1.0 | 33.2 |
| h | 100 | Methallyl Acetate | 100.0 | 0.15 | 15.0 | 17.6 |
| i | 100 | 2,3-Dichloropropene | 100.0 | 4.0 | 3.5 | 107.5 |

[1] Repetition in the presence of 0.5 part of catalyst effects gelation in 0.1 hour.

From the results in Table I above it is apparent that the polymerization of a 2-propen-2-oxyalkyl alkenoate such as beta-allyloxyethyl acrylate in the presence of even a small amount of a 2-propenyl alcohol, ether, chloride, or ester secures an increased yield of soluble, unsaturated polymeric material. As the amount of the 2-propenyl alcohol, ether, chloride, or ester in the reaction mixture is increased the proportion of the monomeric 2-propenoxyalkyl alkenoate converted to the soluble polymeric form is likewise increased, and thus by my invention it is now possible to convert the major proportion of a 2-propenoxyalkyl alkenoate to a soluble, unsaturated polymer without danger of gelation.

EXAMPLE 2

That my new soluble, unsaturated resins are true interpolymers is proven by the following reaction.

A mixture of 200 parts of beta-allyloxyethyl acrylate, 200 parts of methallyl chloride and 6.0 parts of benzoyl peroxide is heated at 60° C. for approximately 5 hours. The viscous reaction mixture is then cooled and the copolymer is isolated and purified as in Example 1 above to yield 147.6 parts of white polymeric solid containing 8.79% by weight of chlorine. The analysis indicates in an interpolymer containing approximately 22.5% by weight of interpolymerized methallyl chloride and 77.5% of interpolymerized beta-allyloxyethyl acrylate, which corresponds to a conversion of approximately 57% by weight of the monomeric beta-allyloxyethyl acrylate to the soluble polymeric form.

EXAMPLE 3

This illustrates the practical application of my new interpolymers to the preparation of air-drying coating compositions.

A mixture of 50 parts of beta-allyloxyethyl acrylate, 100 parts of allyl alcohol and 2.0 parts of benzoyl peroxide is heated at 60° C. for approximately 48 hours. The reaction product is isolated and purified in the manner of previous examples to yield 37.5 parts of solid copolymer.

*Analyses.*—Found, percent hydroxyl, 6.27; iodine (Wijs) number, 125.

The hydroxyl groups present in the product are derived from the interpolymerized allyl alcohol, and the iodine number indicates the amount of residual unsaturation extant in the interpolymer arising from the presence of interpolymerized beta-allyloxyethyl acrylate.

(a) Four parts of the interpolymer are dissolved in a mixture of 4 parts of xylene and 1 part of n-butanol. The solution is poured onto a glass plate in a thin film and baked at 60° C. for 20 hours to yield a clear, colorless coating which is resistant to alcohol and acetone.

(b) To another identical interpolymer solution is added 0.82 part of a 1.0% xylene solution of cobalt in the form of cobalt naphthenate. A film of this solution laid down on a glass plate is cured to a clear, acetone and alcohol-resistant coating in 24 hours at 25° C. Another film of the same solution on a walnut veneer panel becomes tack-free in 8 hours at 25° C. and resistant to alcohol and acetone within 16 additional hours at 25° C.

EXAMPLE 4

Although the preceding examples have described only the binary interpolymers of propen-2-oxyalkyl alkenoates with 2-propenyl alcohols, chlorides, ethers or esters, my invention likewise embraces the interpolymers of the above types of compounds together with one or more other copolymerizable monoolefinic compounds. The preparation of such interpolymers is illustrated in Table II below, the reactions being carried out in the manner of Example 1.

Table II

| | Parts Beta-Allyloxyethyl Acrylate | 2-Propenyl Alcohol, Chloride Ether or Ester | Parts | Copolymerizable Monomer | Parts | Parts Benzoyl Peroxide | Reaction Time (hours) | Parts Soluble Polymeric Product Obtained |
|---|---|---|---|---|---|---|---|---|
| a | 100 | | | Methyl Acrylate | 25.0 | 0.8 | 8.8 | 6.4 |
| b | 100 | Methallyl Alcohol | 100.0 | do | 25.0 | 2.0 | 5.3 | 32.6 |
| c | 100 | | | do | 50.0 | 1.8 | 2.75 | 9.9 |
| d | 100 | Methallyl Alcohol | 20.0 | do | 50.0 | 1.0 | 3.3 | 16.4 |
| e | 100 | do | 100.0 | do | 50.0 | 2.0 | 8.8 | 37.5 |
| f | 100 | do | 200.0 | do | 50.0 | 3.0 | 3.5 | 81.0 |
| g | 100 | Methallyl Chloride | 100.0 | do | 50.0 | 2.0 | 6.25 | 72.0 |
| h | 100 | Methallyl Ethyl Ether | 100.0 | do | 50.0 | 2.0 | 3.7 | 31.5 |
| i | 100 | Methallyl Acetate | 100.0 | do | 50.0 | 2.0 | 4.0 | 20.0 |
| j | 100 | Allyl Alcohol | 100.0 | do | 50.0 | 2.0 | 12.5 | 42.5 |
| k | 100 | | | Styrene | 50.0 | 0.8 | 1.75 | 9.9 |
| l | 100 | Methallyl Alcohol | 100.0 | do | 50.0 | 2.0 | 4.2 | 36.2 |
| m | 100 | do | 200.0 | do | 50.0 | 4.8 | 6.33 | 58.9 |
| n | 100 | | | Diethyl Fumarate | 50.0 | 1.0 | 0.5 | 11.3 |
| o | 100 | Methallyl Alcohol | 100.0 | do | 50.0 | 2.0 | 3.5 | 52.5 |
| p | 100 | | | Vinyl n-butyl Ether | 50.0 | 1.0 | 0.33 | 7.7 |
| q | 100 | Methallyl Alcohol | 100.0 | do | 50.0 | 2.0 | 29.3 | 51.0 |
| r | 100 | | | Vinyl Acetate | 50.0 | 0.6 | 0.66 | 11.5 |
| s | 100 | Methallyl Alcohol | 100.0 | do | 50.0 | 0.12 | 1.75 | 37.0 |

EXAMPLE 5

A mixture of 200 parts of beta-allyloxyethyl acrylate, 400 parts of methallyl alcohol and 9.6 parts of benzoyl peroxide is heated at 60° C. for approximately 6.3 hours. The reaction product is isolated and purified in the manner of previous examples to yield 117.8 parts of the solid, ternary interpolymer.

*Analysis.*—Found, percent hydroxyl, 3.18; iodine (Wijs) number, 90.

Four parts of the interpolymer are dissolved in a mixture of 4 parts of xylene, 1 part of n-butanol and 0.3 ml. of a 1% xylene solution of cobalt naphthenate. A film is poured onto a glass plate and heated at 60° C. The film is tack-free in 0.5 hour and is cured to an alcohol and acetone-resistant coating within 17 hours.

Having thus described my invention, what I claim and desire to protect by Letters Patent is:

1. A process of making a soluble, unsaturated air-drying resin which comprises heating a mixture of (A) an ester of a beta-(2-alkenoxy) alkanol selected from the group consisting of $$CH_2=CH-CH_2-O-CH(R')-CH(R'')-OH$$
$$RCH=CH-CH_2-O-CH(R')-CH(R'')-OH$$

and $$CH_2=C(R)-CH_2-O-CH(R')-CH(R'')-OH$$

where R is an alkyl group containing not over three carbon atoms and R' and R'' are selected from the group consisting of hydrogen and alkyl groups containing not over three carbon atoms with an acid having the formula $$CH_2=C(R)-COOH$$

where R is selected from the group consisting of hydrogen, methyl, ethyl and chlorine, (B) a 2-alkenyl compound selected from the group consisting of $CH_2=CH-CH_2X$, $RCH=CH-CH_2X$, and $CH_2=C(R)-CH_2X$, where R is selected from the group consisting of chlorine, methyl, chloromethyl and ethyl and where X is selected from the group consisting of hydroxyl, chlorine, alkoxy, cycloalkoxy, aryloxy, aralkoxy, and acyloxy derived from a non-enic monocarboxylic acid, the amount of (B) ranging from 1 to 5 moles per mole of (A), and (C) a catalytic amount of an organic peroxide, at a temperature of from 60° C. to 100° C. for a time which is considerably longer than would be possible without gelation in the absence of (B), and thereby effecting polymerization of a considerably higher proportion of (A) to soluble polymeric form than would be possible in the absence of (B), halting the polymerization before gelation occurs and thereby obtaining a soluble, unsaturated, air-drying resinous interpolymer of (A) and (B) which is convertible to insoluble, heat-resistant form by further polymerization at room temperature and in the presence of oxygen.

2. A process of making a soluble, unsaturated air-drying resin which comprises heating a mixture of (A) beta-allyloxyethyl acrylate and (B) a 2-alkenyl compound selected from the group consisting of

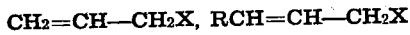

and

where R is selected from the group consisting of chlorine, methyl, chloromethyl and ethyl and where X is selected from the group consisting of hydroxyl, chlorine, alkoxy, cycloalkoxy, aryloxy, aralkoxy, and acyloxy derived from a non-enic monocarboxylic acid, the amount of (B) ranging from 1 to 5 moles per mole of (A), and a catalytic amount of an organic peroxide, at a temperature of from 60° C. to 100° C. for a time which is considerably longer than would be possible without gelation in the absence of (B), and thereby effecting polymerization of a considerably higher proportion of (A) to soluble polymeric form than would be possible in the absence of (B), halting the polymerization before gelation occurs, and thereby obtaining a soluble, unsaturated, air-drying resinous interpolymer of (A) and (B) which is convertible to insoluble, heat-resistant form by further polymerization at room temperature and in the presence of oxygen.

3. A soluble, unsaturated air-drying resinous interpolymer of (A) an ester of a beta-(2-alkenoxy) alkanol selected from the group consisting of

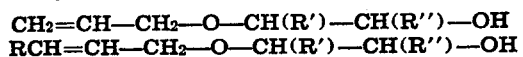

and

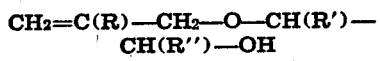

where R is an alkyl group containing not over three carbon atoms and R' and R'' are selected from the group consisting of hydrogen and alkyl groups containing not over three carbon atoms with an acid having the formula

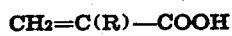

where R is selected from the group consisting of hydrogen, methyl, ethyl and chlorine, and (B) a 2-alkenyl compound selected from the group consisting of

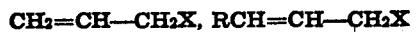

and

where R is selected from the group consisting of chlorine, methyl, chloromethyl and ethyl and where X is selected from the group consisting of hydroxyl, chlorine, alkoxy, cycloalkoxy, aryloxy, aralkoxy, and acyloxy derived from a non-enic monocarboxylic acid, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

4. A soluble, unsaturated, air-drying resinous interpolymer of (A) beta-allyloxy-ethyl acrylate and (B) a 2-alkenyl compound selected from the group consisting of $CH_2=CH-CH_2X$, $$RCH=CH-CH_2X \text{ and } CH_2=C(R)-CH_2X$$

where R is selected from the group consisting of chlorine, methyl, chloromethyl and ethyl and where X is selected from the group consisting of hydroxyl, chlorine, alkoxy, cycloalkoxy, aryloxy, aralkoxy, and acyloxy derived from a non-enic monocarboxylic acid, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

5. A soluble, unsaturated, air-drying, resinous interpolymer of (A) beta-allyloxyethyl acrylate and (B) allyl alcohol, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

6. A soluble, unsaturated, air-drying, resinous interpolymer of (A) beta-allyloxyethyl acrylate and (B) methallyl alcohol, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

7. A soluble, unsaturated, air-drying, resinous interpolymer of (A) beta-allyloxyethyl acrylate and (B) methallyl chloride, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

8. A soluble, unsaturated, air-drying, resinous interpolymer of (A) beta-allyloxyethyl acrylate and (B) methallyl ethyl ether, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

9. A soluble, unsaturated, air-drying, resinous interpolymer of (A) beta-allyloxyethyl acrylate and (B) methallyl acetate, the amount of (B) in the monomeric mixture from which said interpolymer was prepared ranging from 1 to 5 moles per mole of (A), said interpolymer being convertible to insoluble, heat-resistant form by further polymerization at room temperature and in the presence of oxygen.

PLINY O. TAWNEY.

REFERENCES CITED

The following references are of record in the file of this patent:

UNITED STATES PATENTS

| Number | Name | Date |
| --- | --- | --- |
| 2,441,516 | Snyder | May 11, 1948 |
| 2,444,655 | Kroeker et al. | July 6, 1948 |